United States Patent
Andres et al.

(10) Patent No.: US 8,239,089 B2
(45) Date of Patent: Aug. 7, 2012

(54) APPARATUS AND METHOD FOR DETECTING DEFORMATIONS ON A VEHICLE COMPONENT

(75) Inventors: Thorsten Andres, Paderborn (DE); Bjorn Richter, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 328 days.

(21) Appl. No.: 12/580,620

(22) Filed: Oct. 16, 2009

(65) Prior Publication Data

US 2010/0217473 A1    Aug. 26, 2010

(30) Foreign Application Priority Data

Oct. 17, 2008   (DE) .......................... 10 2008 051 796

(51) Int. Cl.
*G06F 19/00*          (2011.01)

(52) U.S. Cl. ...................................... 701/29.1; 180/274

(58) Field of Classification Search .................... 701/29, 701/29.1, 29.6, 30.5, 31.4, 33.6, 33.7; 356/237.2, 356/445, 371, 600, 613, 622; 73/600, 627, 73/514.26; 250/559.18; 180/274, 276
See application file for complete search history.

(56) References Cited

U.S. PATENT DOCUMENTS

| | | | | |
|---|---|---|---|---|
| 4,477,732 A | * | 10/1984 | Mausner | 307/9.1 |
| 4,629,319 A | * | 12/1986 | Clarke et al. | 356/237.2 |
| 5,155,371 A | * | 10/1992 | Burggraf et al. | 250/559.18 |
| 5,251,013 A | * | 10/1993 | Danielson et al. | 356/622 |
| 5,437,186 A | * | 8/1995 | Tschulena | 73/514.26 |
| 5,572,324 A | * | 11/1996 | Ventura | 356/613 |
| 5,818,593 A | * | 10/1998 | Ventura | 356/600 |
| 2002/0063008 A1 | * | 5/2002 | Spies | 180/274 |
| 2002/0088933 A1 | * | 7/2002 | Yu et al. | 250/231.13 |

* cited by examiner

*Primary Examiner* — Thomas G. Black
*Assistant Examiner* — Marthe Marc-Coleman
(74) *Attorney, Agent, or Firm* — Henry M. Feiereisen; Ursula B. Day; Stefan Knirr

(57) ABSTRACT

An apparatus and a method for detecting deformations of a vehicle component on a motor vehicle are disclosed, which are capable of unambiguously determining the location and temporal progression of the deformation, as well as the severity of the deformation, within a very short time after the deformation of the vehicle component begins. A grid module having a grid, an emitter component with a light emitter; and a detector with at least one sensor unit are hereby provided on the vehicle component. A beam path of a light beam between the light emitter and the detector is alternatingly interrupted when the grid is displaced relative to the emitter component due to a deformation of the vehicle component. The detector detects a signal in form of light pulses generated by the interruption of the light beam and the light pulses are transmitted as a time-modulated signal to an evaluation unit.

23 Claims, 4 Drawing Sheets

APPARATUS AND METHOD FOR DETECTING DEFORMATIONS ON A VEHICLE COMPONENT

CROSS-REFERENCES TO RELATED APPLICATIONS

This application claims the priority of German Patent Application, Serial No. 10 2008 051 796.8, filed Oct. 17, 2008, pursuant to 35 U.S.C. 119(a)-(d), the content of which is incorporated herein by reference in its entirety as if fully set forth herein.

This is one of two applications both filed on the same day. Both applications deal with related inventions. They are commonly owned and have the same inventive entity. Both applications are unique, but incorporate the other by reference. Accordingly, the following U.S. patent application is hereby expressly incorporated by reference: "APPARATUS AND METHOD FOR DETECTING DEFORMATIONS ON A VEHICLE COMPONENT".

BACKGROUND OF THE INVENTION

The present invention relates to an apparatus and a method for detecting deformations of vehicle components, in particular on a motor vehicle.

The following discussion of related art is provided to assist the reader in understanding the advantages of the invention, and is not to be construed as an admission that this related art is prior art to this invention.

Detecting motor vehicle accidents is very important for protecting the occupants in order to initiate relevant safety measures, for example, deploying an airbag. German Offenlegungsschrift DE 10 2004 029 816 A1 discloses the provision of acceleration sensors to detect a sudden change in the speed of a motor vehicle. The acceleration sensor hereby reacts purely mechanically to deceleration of a vehicle by, for example, deflecting a seismic mass of the sensor. The electric properties between movable and fixed webs of the sensor thereby change, representing a measure for the magnitude of the acceleration/deceleration.

Disadvantageously, when using central acceleration sensors, for example in the event of a frontal impact, the acceleration force produced at a low speed is not significantly different from the acceleration force produced during the accident at a very high speed during the first 20 to 30 ms. Significant differences are encountered only at times that are greater than 30 ms, because the impact energy at the beginning of the accident is absorbed by the soft basic structure of the crash box. The rest of the body experiences only a slight acceleration/deceleration during that time. In addition, the location of the impact and the intensity of the accident can only be approximately determined.

German Offenlegungsschrift DE 10 2005 046 928 A1 detects an accident by evaluating sound produced by the body, also referred to as Crash Impact Sound Sensing (CISS). When structural components of a motor vehicle are deformed, the generated stress produces micro-fractures in the components, which is associated with the emission of sound waves from the body. Deformations of the vehicle body caused by the accident can then be identified by digitally evaluating the body sound signal. However, it is difficult to select the origin of the impact or the deformation, because the origin of the body sound is also unknown. In addition, a characteristic signal must be present to unambiguously distinguish the accident or the deformation of the vehicle body from other disturbances. This requires separation of the signal from these disturbances, which necessitates a correspondingly high computing power and a computing time of about 15 ms.

It would therefore be desirable and advantageous to obviate prior art shortcomings and to provide an improved apparatus and a method capable of unambiguously identify the location of the deformation of a vehicle component and the temporal progression of the deformation, so that the severity of the accident can be better determined. The evaluation should be performed within a very short timeframe, in particular less than 10 ms, after the crash occurs and should not require complicated computations.

SUMMARY OF THE INVENTION

According to one aspect of the invention, an apparatus for detecting a deformation of a vehicle component of a motor vehicle includes a sensor unit with a grid module arranged on a vehicle component, for example the vehicle body, with a grid that is displaced relative to a light emitter of an emitter component in the event of a deformation. Displacement of the grid or the light emitter alternatingly interrupts a beam path of a light beam from the light emitter impinging on a detector. The detector identifies the individual light pulses and, based on the light pulses, transmits a time-modulated signal to an evaluation unit which evaluates the signals received from one or several such sensor units.

According to another aspect of the invention, a method for detecting a deformation on a vehicle component includes the steps of providing on the vehicle component a grid module having a grid, an emitter component with a light emitter; and a detector with at least one sensor unit. The method further includes alternatingly interrupting a beam path of a light beam between the light emitter and the detector when the grid is displaced relative to the emitter component due to a deformation of the vehicle component, detecting with the detector a signal in form of light pulses generated by the interruption of the light beam, and transmitting the light pulses as a time-modulated signal to an evaluation unit.

In the context of the present invention, the beam path refers to the path on which a light beam emitted by the light emitter propagates to a detector. The light emitter can be implemented as a light emitting diode (LED), or the light emitter emits a light signal received from a remote light emitting system, for example the evaluation unit, via an optical fiber.

According to another advantageous feature of the present invention, the beam path of the light beam may be straight by placing the detector opposite the light emitter, with the grid being arranged between the light emitter and the detector. The grid of the grid module is here composed of regions which are transparent as well as regions which interrupt the beam path, i.e., opaque regions. The transparent regions can be configured as through-openings with a, for example circular or rectangular shape. Alternatively, the transparent regions can be made of a transparent material, for example glass or plastic, while the remaining regions are made of an opaque material. Alternatively, the entire grid can be made of a transparent material, wherein those regions intended to interrupt the beam path can be made opaque, for example, by applying a coating or a cover.

According to another advantageous feature of the present invention, the light emitter and the detector may be configured as a single unit, and the beam path is no longer straight, but is deflected. The grid then no longer requires openings, but instead regions that reflect the impinging light beam towards the detector and regions that do not reflect the light beam. Absence of reflection may be caused, for example, by scattering, absorption or transmission. The regions interrupting the beam path either have a rough surface which scatters the impinging light beam, or have a surface that absorbs the light beam, or have regions that are transparent for light.

Conversely, regions intended to deflect the beam path may be provided with a reflective coating. This coating can be metallic and may be applied, for example, by sputtering or evaporation.

The regions of the grid that do not interrupt the beam path have preferably a constant width, as measured in the travel direction of the grid, and a constant mutual spacing. The mutual spacing corresponds preferably to the width of the regions interrupting the beam path. This facilitates signal processing.

The grid module may be placed, for example, in a bumper. The emitter component is then arranged on a component of the vehicle body that in the event of an accident is not initially displaced as strongly as the bumper. The emitter component can also be placed on a longitudinal beam of the motor vehicle. The grid module is arranged for travel relative to the emitter component. The grid module can be guided in a guide of the emitter component. The light emitter is here arranged on the emitter component so that the emitted light beam impinges on the grid at a right angle with respect to the movement axis, i.e., to the longitudinal axis of the grid module. Alternatively, the emitter component can be placed on a bumper for movement relative to the grid module.

According to another advantageous feature of the present invention, the angle can vary depending on the geometry of the component.

Different options exist for placement of the detector. With a straight beam path, the detector must be arranged opposite to the light emitter. The detector can then be affixed to the emitter component. Alternatively, the detector can also be affixed to a separate component that is not directly connected with the emitter component. An important feature is the cooperation between the emitter component and the detector component.

In principle, the guide for the grid module can also be integrated in the detector component.

With a deflected beam path, the light emitter and the detector are located in relation to the grid module on the same side. Preferably, the light emitter and the detector form a unit. The light emitter and the detector can be placed directly next to each other. Alternatively, the detector can surround the light emitter. Essential for a reliable detection of the light beam is that the light beam is scattered as little as possible when reflected on the grid module. Desirable is a complete reflection of the light beam. Depending on the location of the detector and the light emitter, in the context of the invention the light beam may also be deflected near the regions reflecting the light beam. For example, the light beam may be intentionally deflected in a certain direction.

As soon as a vehicle component is deformed following an accident, the grid module arranged in the deforming region of the vehicle component is displaced relative to the emitter component and also relative to the detector. In an opposite embodiment, the emitter component and the detector are displaced relative to the grid module during a deformation. In both embodiments, the beam path of the light beam emitted by the light emitter is alternatingly interrupted by the grid module, which produces time-modulated light pulses. The pulse width depends directly on the deformation speed. The number of the individual pulses is also a measure for the intrusion depth, meaning the spatial extent of the deformation of the vehicle component in the region of the sensor unit.

The position of the grid relative to the light emitter for an un-deformed vehicle component can be selected to include a tolerance region before a change is detected. This prevents activation of safety systems, for example, due to vibrations.

According to another advantageous feature of the present invention, the light pulses detected by the detector may be transmitted to the evaluation unit unchanged, i.e., without being first transformed into a different signal form. However, it is not precluded within the context of the invention that the time-modulated light signal is converted into electronic pulses before being transmitted to the evaluation unit. Because conversion takes up time, optical light guides are preferably provided which transmit the detected signals without changing the signal form from the detector to the evaluation unit.

The geometric features in the region of the grid need to be taken into consideration in the evaluation of the light pulses in an evaluation unit. This means that the evaluation unit must know the grid dimension of the grid module in order to be able to compute the desired physical quantities.

The form of the first light pulse already includes information that can be used for evaluation. After between one and two pulses, the evaluation unit has information about a deformation of a vehicle component, its speed and its location, because the detector signal received from the evaluation unit can be unambiguously associated. The greater the number of pulses used in the evaluation, the more accurate the information about the deformation. Depending on the grid dimensions and the speed at the time of the accident, time constants of less than 1 ms are easily attainable. Accordingly, there is only a very small time difference between the time of the accident and the detection. The deformation speed and hence the severity of the accident can be computed very quickly and easily from the known width of the grid regions, the frequency and the number of light pulses. Based on this result, safety systems, in particular systems for protecting occupants, can be activated with a suitable time delay that matches the accident conditions.

The evaluation unit can be implemented as a central node where signals from various sensor units arranged on different vehicle components are merged. The signals from all sensor units can be centrally evaluated in the evaluation unit. In addition, all sensor units can be connected to a central light emitter which can be located in or on the evaluation unit.

For a reliable performance of the sensor, the grid module should be easily displaceable relative to the emitter component. Jamming may be prevented, for example, by implementing only point-wise or line-wise contact between the grid module and a guide of the emitter component. Alternatively, partially yielding materials, in particular plastics, may be used to prevent jamming.

Advantageously, with the invention the optical signal received from the evaluation unit can be directly evaluated without first filtering out disturbances.

The sensor units may be attached on or in the motor vehicle wherever necessary. The motor vehicle can hence be provided with a kind of optical network whose signals are merged in the central evaluation unit. The reaction time of the system is composed of the computing time and the time constant between two pulses or the width of the light pulses. The elapsed time between the beginning of the deformation and computation of the result used for triggering of, for example, occupant protection systems commensurate with the deformation may be in a range between 1 ms and 2 ms. Because the time constant depends on the deformation speed, the reaction time decreases with increasing deformation speed. Optimal protection of the vehicle occupants in the event of an accident is thereby ensured.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
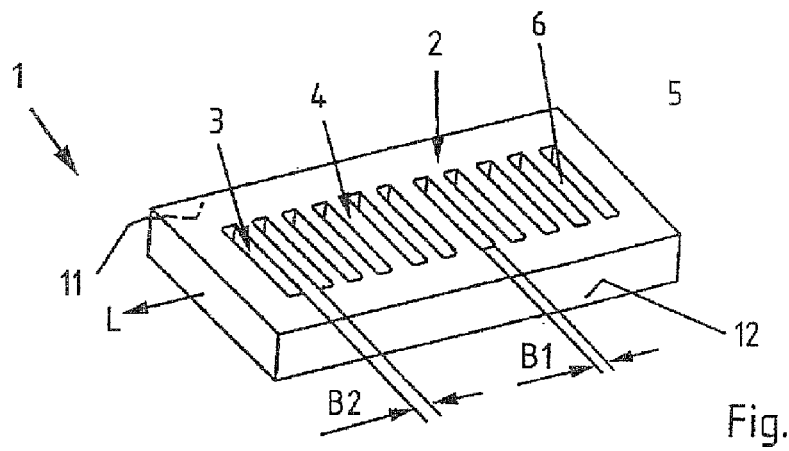
FIG. 1 shows a schematic top and side perspective illustration of a first embodiment of a grid module.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown schematic top and side perspective illustration of a first embodiment of a grid module, generally designated by reference numeral 1 and including a grid 2 which is composed of transparent regions 3 and opaque regions 4. The transparent regions 3 are here implemented as slots 5 extending perpendicular to the longitudinal axis L of the first sensor component 1. The opaque regions 4 between the slots 5 of the grid 2 are implemented as webs 6. All slots 5 have the same width B1. They are separated by the webs 6 which also all have the same width B2. The transparent regions 3 in the illustrated embodiment are implemented as through-openings. However, the transparent regions 3 may also be provided with a transparent material, for example plastic or glass. In addition being embodied as slots, the transparent regions 3 can also be implemented as, for example, circular or rectangular openings.

Figure 2:
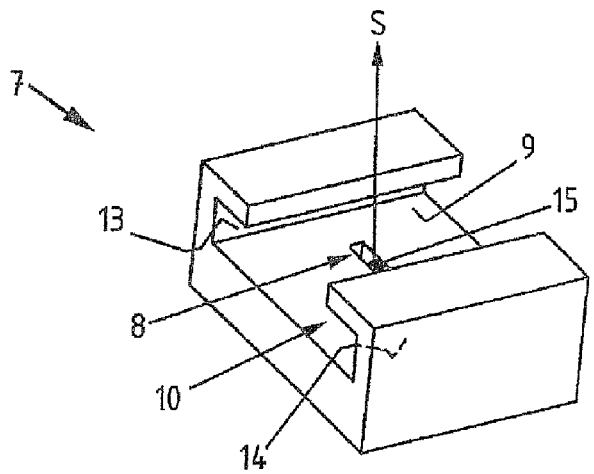
FIG. 2 shows a schematic top and side perspective illustration of a first embodiment of an emitter component.

FIG. 2 shows a schematic top and side perspective illustration of a first embodiment of an emitter component, generally designated by reference numeral 7 and including a light emitter 8. The light emitter 8 is located on the surface 9 of the emitter component 7 that is oriented parallel to the grid 2 of the grid module 1. The light emitter 8 has a maximum width so that it can be barely covered by a web 6 of the grid 2. The light emitter 8 emits a constant light signal S and can, for example, be implemented as an LED 15. The emitter component 7 has also a guide region 10 for the grid module 1. In this exemplary embodiment, the guide 10 is implemented as a linear guide. The longitudinal sides 11, 12 of the grid module 1 are encompassed by sidewalls 13, 14 of the emitter component 7. The region facing the light emitter 8 remains unobstructed. This region is provided for placement of a detector which detects the light beam S emitted by the light emitter 8 or an interruption of the light beam S.

Figure 3:
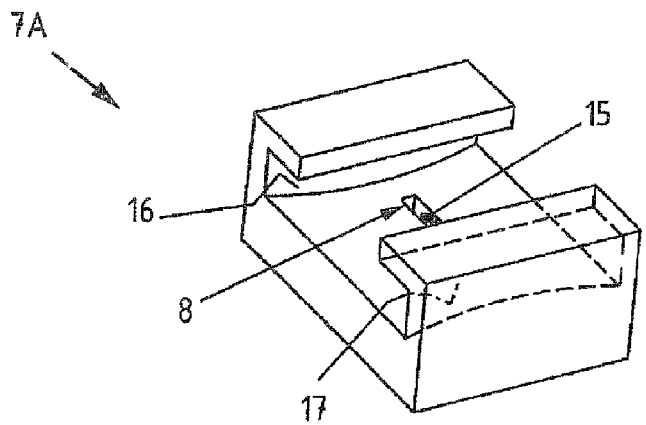
FIG. 3 shows a top and side perspective illustration of a second embodiment of an emitter component.

FIG. 3 shows a top and side perspective illustration of a second embodiment of an emitter component, generally designated by reference numeral 7A. Parts corresponding with those in FIG. 2 are denoted by identical reference numerals and not explained again. The description below will center on the differences between the embodiments. This embodiment represents an alternative to the afore-described guide 10. The surfaces 16, 17 of the emitter component 7 facing the longitudinal sides 11, 12 of the grid module 1 are here not straight, but have a slight outward bend, i.e., are convex. The curvature of the surfaces 16, 17 reduces the risk that the grid module 1 jams in the emitter component 7 during a displacement.

Figure 4:
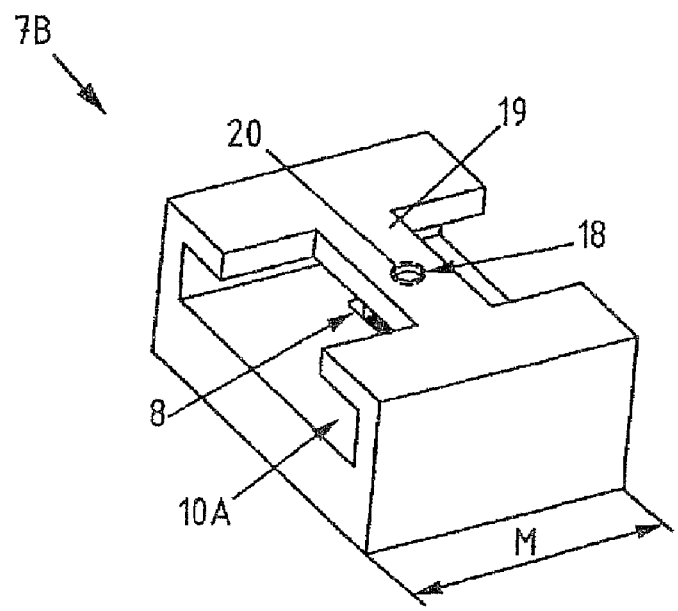
FIG. 4 shows a top and side perspective illustration of a third embodiment of an emitter component.

FIG. 4 shows a top and side perspective illustration of a third embodiment of an emitter component, generally designated by reference numeral 7B. Parts corresponding with those in FIGS. 2 and 3 are denoted by identical reference numerals and not explained again. The description below will center on the differences between the embodiments. In this embodiment, a detector 18 is arranged in a web 19 opposite the light emitter 8. The emitter and detector components are here combined in a single component. The detector 18 is arranged so as to face the light emitter 8. A connector 20 is located on the other side of the detector 18 facing away from the light emitter 8, with the detected signals transmitted to an evaluation unit via the connector 20.

Alternatively, the web 19 can extend over the entire length M of the guide 10A.

Figure 5:
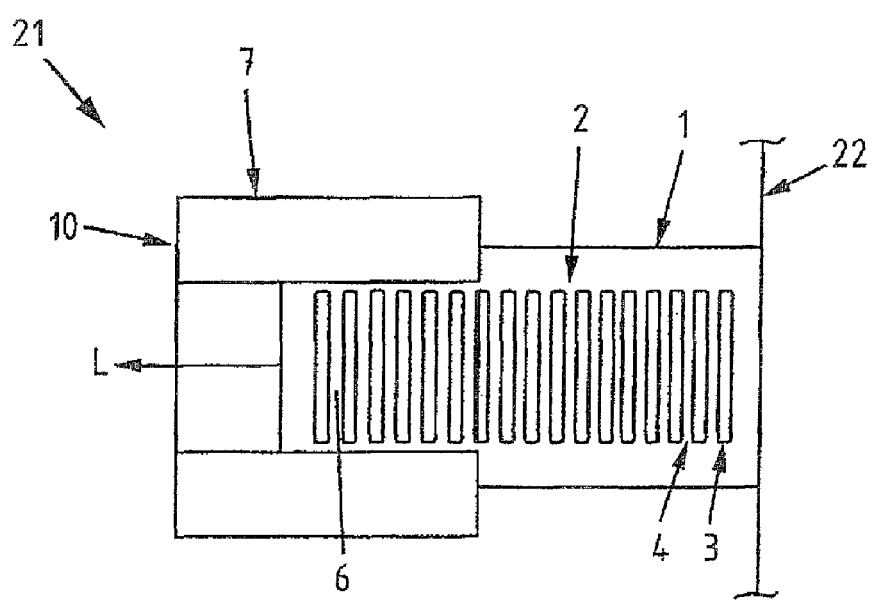
FIG. 5 shows a schematic top view of one embodiment of a sensor unit.

Referring now to FIG. 5, there is shown a schematic top view of one embodiment of a sensor unit, generally designated by reference numeral 21. The grid module 1 is here guided through the guide 10 of the emitter component 7. The grid module 1 is connected with a vehicle component 22 or a bumper and is displaced relative to the emitter component 7 along its longitudinal direction L in the event of a deformation of the vehicle component 22. The grid 2 of the grid module 1 hereby moves past the light emitter 8, with the transparent regions 3 alternating with the opaque regions 4. In FIG. 5, the light beam S is interrupted by a web 6 wherein the light emitter 8 is covered by the web 6.

Figure 6:
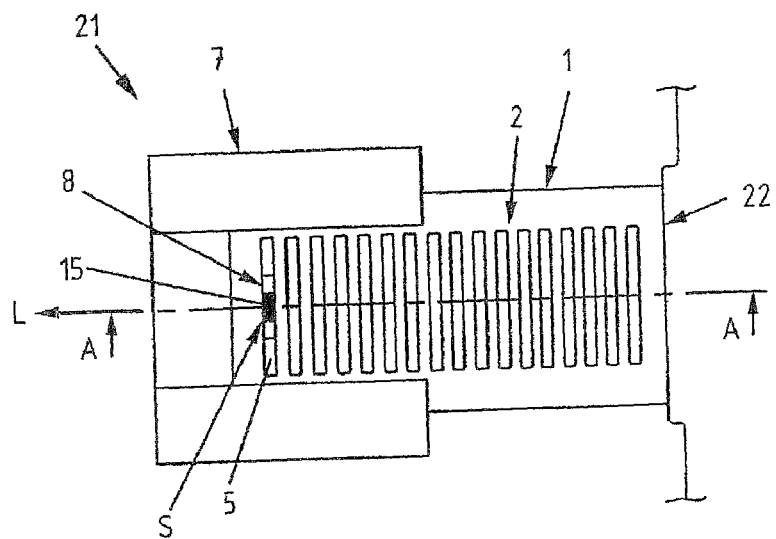
FIG. 6 shows a top view of the sensor unit of FIG. 5 with a displaced grid module.

FIG. 6 shows another schematic illustration of the sensor unit 21, which differs from FIG. 5 in that the grid module 1 was slightly displaced along its longitudinal axis L relative to the emitter component 7 as a result of the indicated deformation of the vehicle component 22. As indicated, a slot 5 of the grid 2 is here located above the light emitter 8. The beam path is not interrupted and the light beam S emitted by the LED 15 can be directly detected. The detector (not shown in FIG. 6) is arranged with respect to the light emitter 8 on the observer side of the grid 2.

Figure 7:
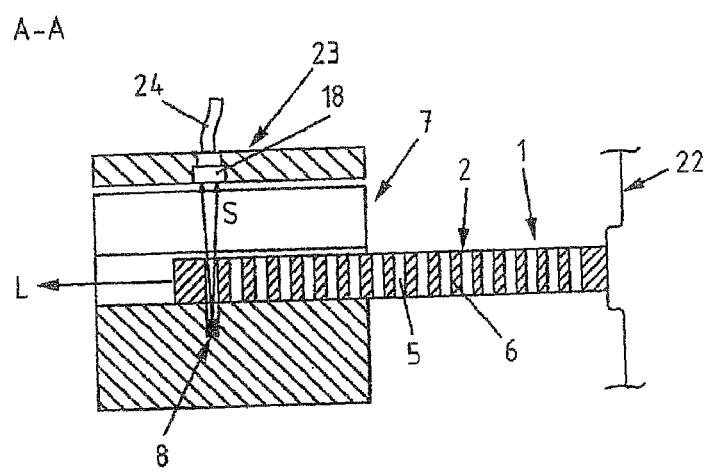
FIG. 7 shows a cross-sectional view of the sensor unit of FIG. 6.

In FIGS. 5 and 6, the detector is not part of the emitter component 7, but is arranged on a detector component 23. This is illustrated in FIG. 7 by way of a longitudinal section. As can be seen, the beam path is not interrupted and the light beam S passes through the slot 5 of the grid 2. Thereafter, the light beam S impinges on the detector 18 arranged opposite to light emitter 8. When the grid module 1 is displaced further along its longitudinal direction L, the beam path is interrupted by the web 6. This interruption produces time-modulated light pulses. The detector 18 connected with the evaluation unit transmits the light pulses, for example through an optical fiber 24, to the evaluation unit, which can compute all necessary information relating to the deformation speed and the progression of the deformation of the vehicle component 22 based on the temporal spacing, i.e., the frequency and the number of the individual pulses.

Figure 8:
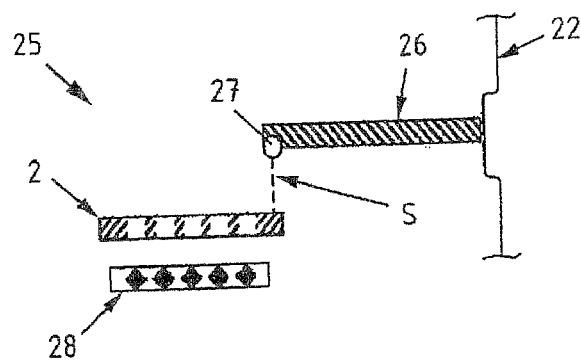
FIG. 8 shows a schematic illustration of another embodiment of a sensor unit.

FIG. 8 shows a schematic illustration of another embodiment of a sensor unit, generally designated by reference numeral 25. In this embodiment, the emitter component 26 with the light emitter 27 is arranged on a vehicle component 22. In the event of a deformation of the vehicle component, the emitter component 26 with the light emitter 27 is displaced relative to a grid 2. The light beam S emitted from the light emitter 27 is then alternatingly interrupted by and transmitted through the grid 2. The produced light pulses are detected by a detector 28 and transmitted to an evaluation unit. The grid 2 and the detector 28 can be implemented as a single component or as two separate components.

By using an optical coupler with several inputs and a single output, an optical signal similar to the original embodiment is once more produced.

Figure 9:
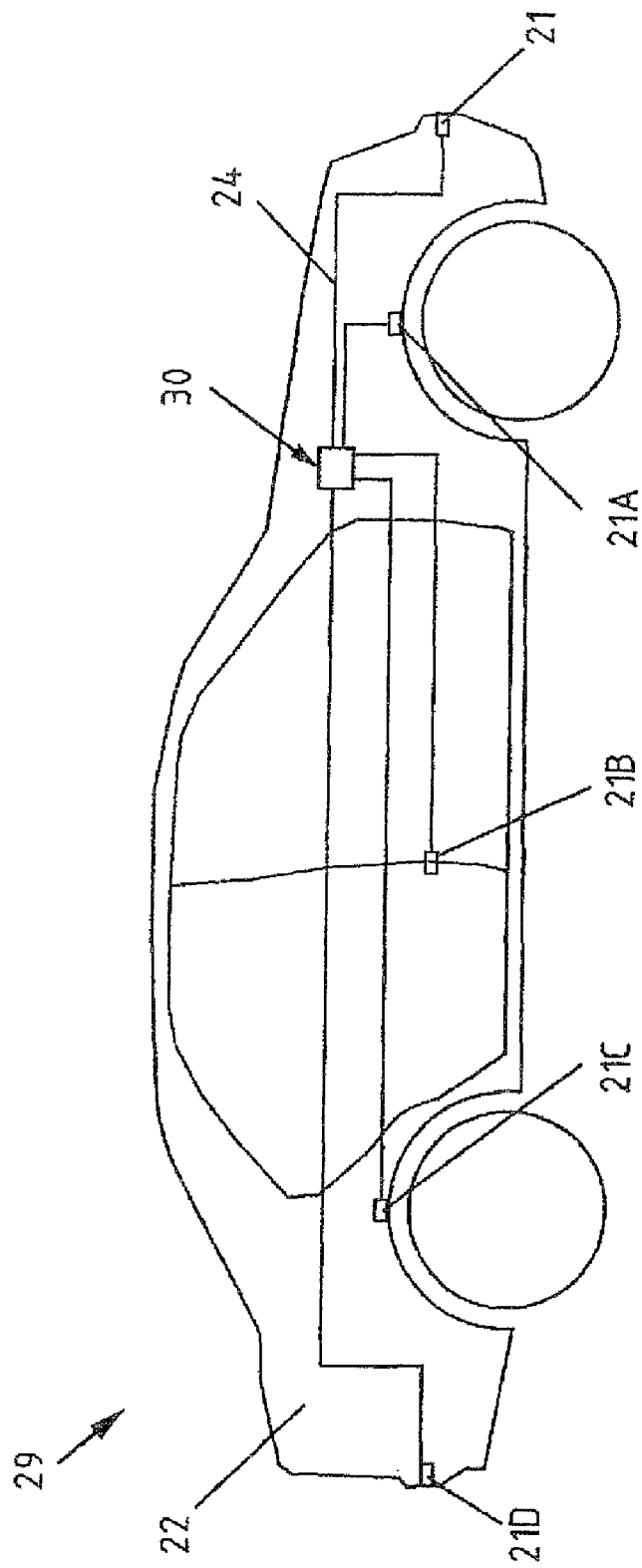
FIG. 9 shows a schematic illustration of a motor vehicle having incorporated therein the subject matter of the present invention.

FIG. 9 shows schematically a motor vehicle 29 with a device for detecting deformations of vehicle components 22. Sensor units 21, 21A, 21B, 21C, 21D are here arranged in different regions of the vehicle components 22, in particular of the body. All sensor units 21, 21A, 21B, 21C, 21D are connected with a central evaluation unit 30. The detected light pulses are transmitted to the evaluation unit 30 through optical fibers 24. The evaluation unit 30 receives simultaneously with the information about the deformation of the vehicle component 22 also information identifying the sensor unit 21, 21A, 21B, 21C, 21D sending the light pulses, and hence information about the location where the deformation occurs. The central evaluation unit 30 can then also be used to activate corresponding safety systems.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for detecting a deformation on a vehicle component, comprising the steps of:
    providing on the vehicle component an emitter component with a light emitter emitting a light beam; a grid module having a linear grid fixedly fastened to a vehicle component and defining regions with optical properties alternating between two states, said grid module being movable relative to the light emitter; and a detector with at least one sensor unit;
    modulating an intensity of the light beam commensurate with the regions with alternating optical properties of the moving arid through movement of the grid module relative to the light emitter;
    detecting with the detector the modulated light intensity; and
    determining with an evaluation unit the deformation of the vehicle component based on the detected modulated light intensity.

2. The method according to claim 1, wherein a first of the two states is an intensity maxima and the second of the two states is intensity minima in the detected modulated light intensity.

3. The method according to claim 2, further comprising the step of computing a speed of the deformation of the vehicle component from a temporal spacing of the detected modulated light intensity between the two states or a duration of the modulated light intensity in at least one of the two states, or both.

4. The method according to claim 2, further comprising the step of computing a progression of the deformation of the vehicle component from a number of intensity maxima or intensity minima in the detected modulated light intensity alternating between the two states.

5. The method according to claim 2, wherein the first state corresponds to a transparent grid region and the second state corresponds to an opaque grid region.

6. The method according to claim 2, wherein the first state corresponds to a region having a low optical reflectivity and the second state corresponds to a region having a high optical reflectivity.

7. The method according to claim 1, wherein the evaluation unit associates the detected modulated light intensity with a predetermined vehicle component.

8. The method according to claim 1, further comprising the step of transmitting input parameters based on the deformation determined in the evaluation unit to a control unit, said control unit capable of activating safety systems.

9. The method according to claim 1, wherein the vehicle component is a body component.

10. An apparatus for detecting a deformation of a vehicle component of a motor vehicle, comprising:
    a sensor unit comprising
        a light emitter emitting a light beam,
        a grid module having a linear grid fixedly fastened to a vehicle component and defining regions with optical Properties alternating between two states, said grid module being movable relative to the light emitter, wherein an intensity of the light beam is modulated by the moving grid module commensurate with the regions with alternating optical properties of the moving grid;
        a detector receiving the modulated light intensity; and
    a central evaluation unit connected to the detector and determining the deformation of the vehicle component based on detector signals commensurate with the modulated light intensity.

11. The apparatus according to claim 10, wherein the first state corresponds to a transparent grid region and the second state corresponds to an opaque grid region.

12. The apparatus according to claim 11, wherein the transparent regions and the opaque regions are arranged alternatingly with uniform spacings therebetween.

13. The apparatus according to claim 11, wherein the opaque regions have constant width.

14. The apparatus according to claim 11, wherein the transparent regions comprise a slot.

15. The apparatus according to claim 10, wherein the first state corresponds to a region having a low optical reflectivity and the second state corresponds to a region having a high optical reflectivity.

16. The apparatus according to claim 10, further comprising an emitter component wherein the detector and the light emitter are arranged on the emitter component.

17. The apparatus according to claim 16, wherein the emitter component comprises a guide that guides the grid module.

18. The apparatus according to claim 16, wherein the emitter component is arranged on a longitudinal beam.

19. The apparatus according to claim 10, further comprising a detector component connected with the light emitter, wherein the detector is arranged on the detector component.

20. The apparatus according to claim 19, wherein the detector component comprises a guide that guides the grid module.

21. The apparatus according to claim 10, wherein the detector is connected with the central evaluation unit via an optical light guide.

22. The apparatus according to claim 10, wherein the grid module is made of a flexible material.

23. A motor vehicle, comprising an apparatus for detecting a deformation of a vehicle component, said apparatus comprising:
- a sensor unit comprising
  - a light emitter emitting a light beam,
  - a grid module having a linear grid fixedly fastened to a vehicle component and defining regions with optical properties alternating between two states, said grid module being movable relative to the light emitter, wherein an intensity of the light beam is modulated by the moving grid module commensurate with the regions with alternating optical properties of the moving arid;
  - a detector receiving the modulated light intensity; and
- a central evaluation unit connected to the detector and determining the deformation of the vehicle component based on detector signals commensurate with the modulated light intensity.

* * * * *

UNITED STATES PATENT AND TRADEMARK OFFICE
CERTIFICATE OF CORRECTION

PATENT NO. : 8,239,089 B2  Page 1 of 1
APPLICATION NO. : 12/580620
DATED : August 7, 2012
INVENTOR(S) : Thorsten Andres et al.

It is certified that error appears in the above-identified patent and that said Letters Patent is hereby corrected as shown below:

Column 7, claim 1, line 12 change "arid" to --grid--.
Column 10, claim 23, line 13 change "arid" to --grid--.

Signed and Sealed this
Second Day of October, 2012

David J. Kappos
*Director of the United States Patent and Trademark Office*